P. A. DE LANGE.
MACHINE FOR CUTTING BEANS AND OTHER LEGUMES.
APPLICATION FILED DEC. 13, 1913.

1,153,041.
Patented Sept. 7, 1915.

WITNESSES

P. A. de Lange.
INVENTOR

BY
ATTORNEY

UNITED STATES PATENT OFFICE.

PIETER ABRAHAM DE LANGE, OF ALKMAAR, NETHERLANDS.

MACHINE FOR CUTTING BEANS AND OTHER LEGUMES.

1,153,041.  Specification of Letters Patent.  Patented Sept. 7, 1915.

Application filed December 13, 1913. Serial No. 806,462.

*To all whom it may concern:*

Be it known that I, PIETER ABRAHAM DE LANGE, manufacturer, a subject of the Queen of the Netherlands, residing at Kennemerpark, in the city of Alkmaar and the Province of North Holland, Netherlands, have invented new and useful Improvements in a Machine for Cutting Beans and other Legumes, of which the following is a specification.

This invention relates to a machine for cutting beans and other legumes.

According to this invention, this machine comprises an endless conveyer band and a set of rotary feed rollers, which form a funnel into which the goods to be cut are guided by the endless band and conveyed by means of the feed rollers to a rotary cutting disk to be cut.

Figure 1:
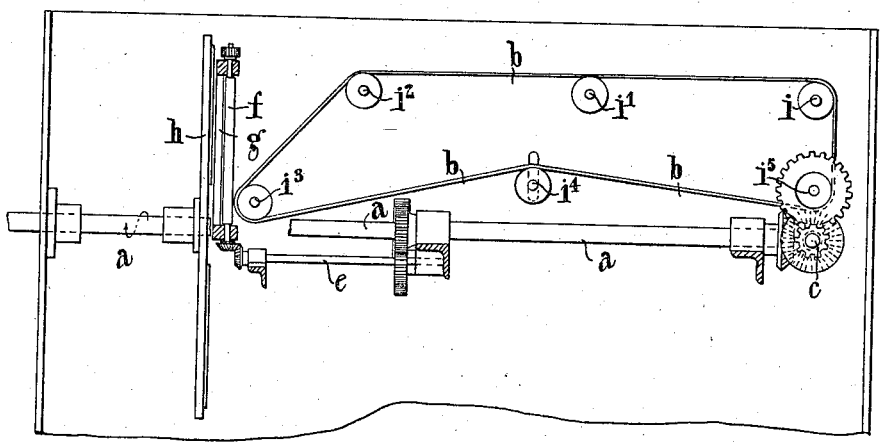
Figure 2:
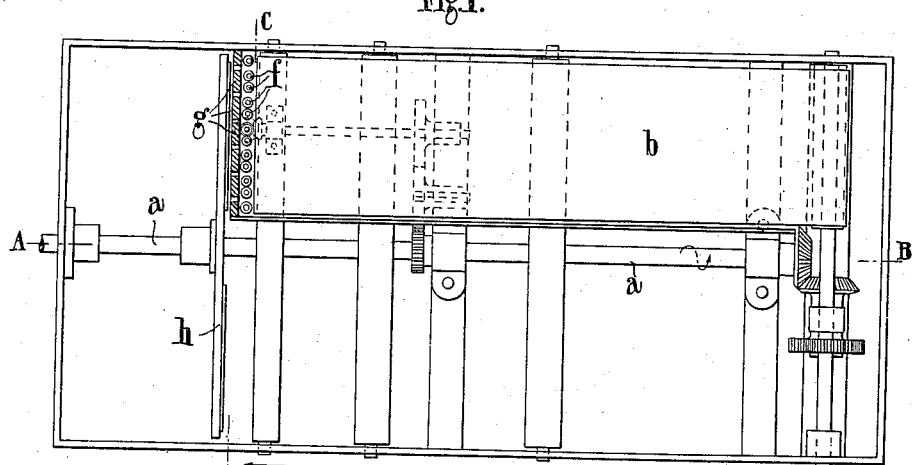
Figure 3:
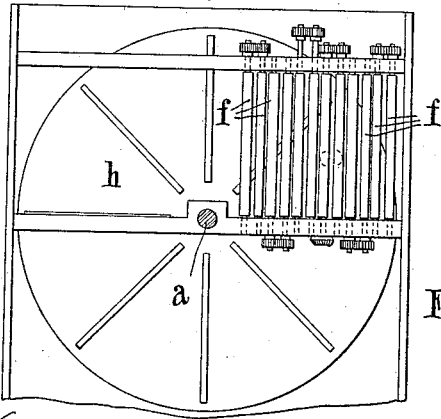

Referring to the drawing, Figure 1 is a side elevation of the machine with one of the side walls missing. Fig. 2 is a plan of the machine, and Fig. 3 is a front elevation of the machine with the belt and its supporting and actuating means omitted.

A frame of any desirable form serves for supporting the driving shaft $a$ of the endless band $b$ and for arranging the means for transmitting the rotary movement of the shaft $a$ to the band. These means may be of any desirable construction. In the illustrated form, they comprise a bevel-wheel gear, which connects the main shaft $a$ with a supplemental shaft $c$, from which latter the endless band $b$ is driven by means of a gear transmission. The main shaft $a$ serves further for transmitting the rotary movement to the feed rollers, which latter, in common with the endless band $b$, form the funnel for receiving the goods to be cut. This driving gear constitutes a number of gear wheels engaging with each other, which drive a supplemental shaft $e$ mounted parallel to the main shaft $a$. The movement of said supplemental shaft $e$ is transmitted to the rollers $f$ by any suitable means.

In the illustrated form of construction, the transmission of movement from the shaft $e$ to the rollers $f$ is performed by means of a bevel-wheel gear and spur wheels. The latter are arranged on the upper and lower ends of the rollers and intermesh with each other, so that the rollers which are in sets of two rotate in opposite directions to each other to advance the beans to the cutter. Adjacent the roller $f$, a grating $g$ is arranged, which serves for guiding the goods to be cut to a cutting disk $h$, which is arranged adjacent the grating $g$ and is mounted on the driving shaft $a$.

The endless band $b$ is guided over a plurality of conveyer rollers $i$, $i'$, $i^2$, $i^3$, $i^4$, $i^5$, of which the two front ones are so arranged that they guide the band in a downward direction. The feed rollers are arranged at an acute angle to the slanting band, while the grating is by preference vertically disposed and parallel to the cutting disk and between said disk and the feed rollers. The goods to be cut are placed on the endless band moving toward the feed rollers and pass into the funnel or wedge-shaped space between the slanting part of the band and the feed rollers. The beans or other goods to be cut are gripped by a pair of feed rollers and fed through the slits of the grating. The grip of the feed rollers is such that the beans are held up to the last bit, so that the whole length is entirely cut up. As the beans are conveyed by the feed rollers in a horizontal direction and are gripped in an oblique manner, the grip is gradually elevated as the feed advances, therefore the same rollers are adapted to receive one or more beans before the first bean has been completely cut.

I claim—

A machine for cutting beans and other legumes comprising a movable cutter, a grating adjacent the cutter, a plurality of spaced pairs of feed rolls adjacent the grating the openings between which feed rolls register with the openings in the grating for feeding the legumes through the grating to the cutter, and an endless conveyer band arranged to move adjacent the feed rolls in a plane slanting relatively to the axes of the rolls for feeding the legumes to the latter in an oblique direction relatively to the axes of the feed rolls.

In testimony whereof I have signed my name to this specification in the presence of two subscribing witnesses.

PIETER ABRAHAM DE LANGE.

Witnesses:
 AREMD KORVENON,
 C. HILDERING.